US006481727B1

(12) United States Patent
Stallbaumer

(10) Patent No.: US 6,481,727 B1
(45) Date of Patent: Nov. 19, 2002

(54) HAND TRUCK TOE PLATE AND METHOD OF MANUFACTURE

(75) Inventor: John J. Stallbaumer, Wichita, KS (US)

(73) Assignee: Harper Trucks, Inc., Wichita, KS (US)

( * ) Notice: Subject to any disclaimer, the term of this patent is extended or adjusted under 35 U.S.C. 154(b) by 0 days.

(21) Appl. No.: 09/447,911

(22) Filed: Nov. 23, 1999

Related U.S. Application Data

(60) Provisional application No. 60/109,776, filed on Nov. 25, 1998.

(51) Int. Cl.[7] .................................................. B62B 1/10
(52) U.S. Cl. ................. 280/47.24; 280/47.27; 29/897.2
(58) Field of Search ................. 280/654, 659, 280/43.1, 43.11, 47.24, 47.27, 79.11, 79.3, 79.7, 47.131, 1.5; 29/34 R, 897.3, 897.2, 897.32, 897.312, 412, 417, DIG. 3, DIG. 37; D34/12, 26

(56) References Cited

U.S. PATENT DOCUMENTS

| | | | | |
|---|---|---|---|---|
| 2,543,254 A | * | 2/1951 | Osborn | 414/446 |
| 2,921,798 A | * | 1/1960 | Cislak | 280/47.27 |
| 3,361,439 A | * | 1/1968 | Olson | 280/43.1 |
| 3,785,669 A | * | 1/1974 | Doheny | 280/47.18 |
| 3,927,898 A | * | 12/1975 | Weyrauch | 280/47.27 |
| 4,120,065 A | * | 10/1978 | Sivachenko | 14/6 |
| 4,756,540 A | * | 7/1988 | Crawford | 280/47.21 |
| 5,186,571 A | * | 2/1993 | Hentzschel | 403/231 |
| 5,419,600 A | * | 5/1995 | Tisbo | 294/54.5 |
| 5,549,317 A | * | 8/1996 | Dunkle | 280/652 |
| 5,564,248 A | * | 10/1996 | Callies | 52/702 |
| 5,749,588 A | * | 5/1998 | Stallbaumer | 280/47.27 |
| D395,105 S | * | 6/1998 | Stallbaumer | D34/12 |

OTHER PUBLICATIONS

Sheet Metal Fabricating, Reinhold Publishing Corp., 1951.*
Magliner Catalog 1997 and attached web page from 2000.*

* cited by examiner

*Primary Examiner*—Brian L. Johnson
*Assistant Examiner*—Christopher Bottorff
(74) *Attorney, Agent, or Firm*—Edward L. Brown, Jr.

(57) ABSTRACT

A hand truck toe plate formed from light gauge steel sheet having a load supporting horizontal portion and a mounting vertical portion. The horizontal portion and vertical portion are separated by a 90 degree bend and include a plurality of longitudinal ribs. The vertical portion also includes two lateral ears that each have an end defined by a notch and are adapted to be mounted to side frames of the hand truck.

8 Claims, 3 Drawing Sheets

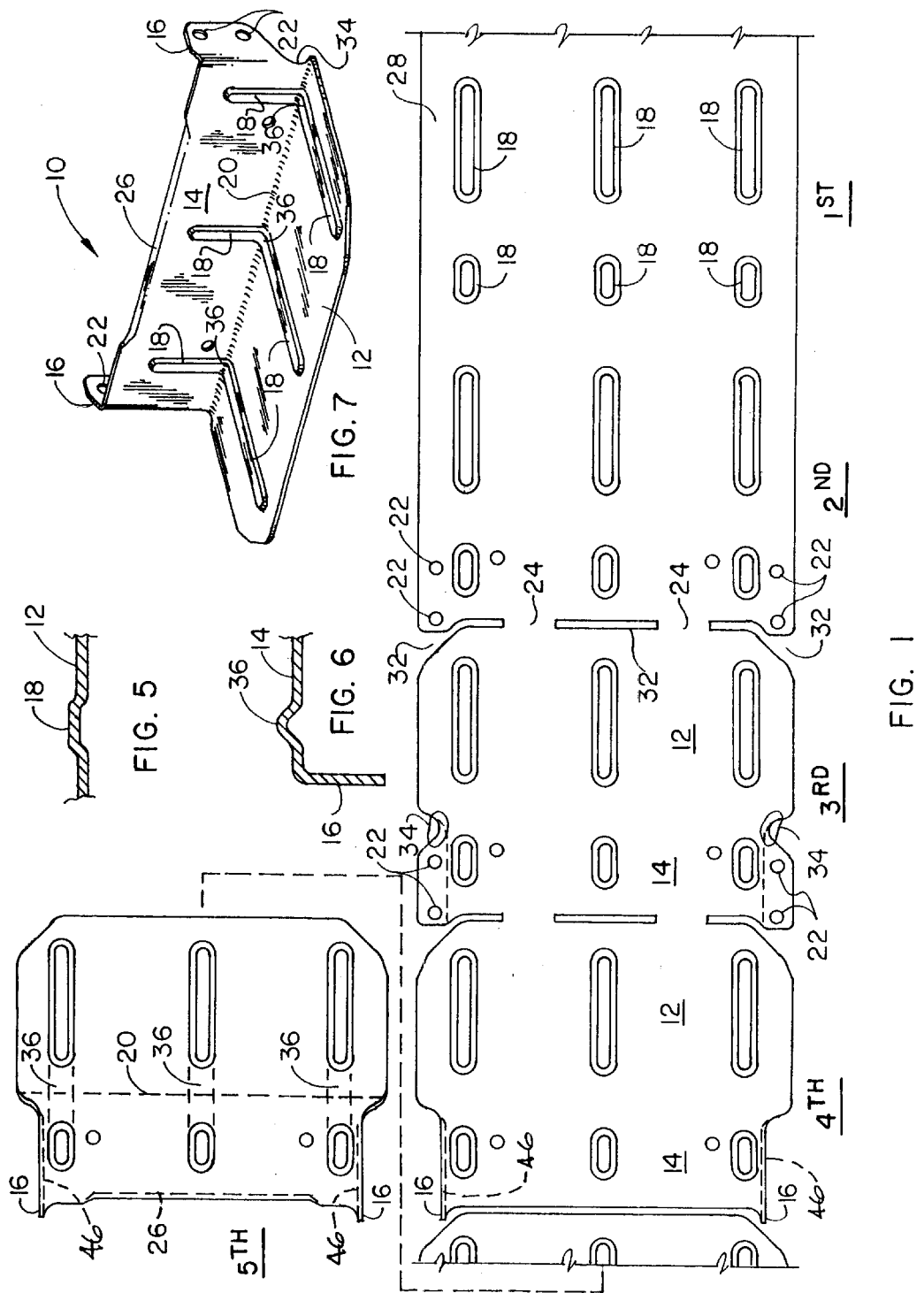

HAND TRUCK TOE PLATE AND METHOD OF MANUFACTURE

This application claims benefit of Provisional Application Ser. No. 60/109,776 filed Nov. 25, 1998.

BACKGROUND OF THE INVENTION

The toe plate of a hand truck is located at the lower front edge of the truck adjacent to the ground and functions to support the load being transported with a horizontal angular portion cantilevered outward which transmits the weight of the load to the remaining structure of the hand truck. The horizontal portion of the toe plate is the most highly stressed part of the hand truck as to any bending loads.

Traditionally, toe plates have been either cast aluminum or a welded steel plate fabrication. Since the end of the toe plate must sustain substantial bending loads, light-gauge steel plate has not been utilized until the design of the present invention.

SUMMARY OF THE INVENTION

The toe plate of the present invention is formed from a relatively light gauge coiled steel sheet which forms the toe plate through a series of automated steps including punching and forming. The first step involves forming a series of three longitudinal ribs in the horizontal load supporting portion of the toe plate and three additional ribs in the vertical mounting portion of the toe plate which are aligned with the three ribs in the horizontal portion of the plate.

The second progression or step of the tooling stamps a series of mounting holes in the vertical portion of the toe plate and also shapes the ends of the toe plates leaving a small tab area so as to retain the still-flattened toe plates as a part of the feed sheet coming off the coil.

In the third progression, lateral side notches are cut in the sheet defining the horizontal portion of the toe plate from the vertical mounting portion of the toe plate.

The fourth progression step bends the mounting ears back through a 90 degree bend from the mounting portion of the toe plate.

The fifth progression step forms a 90 degree bend between the horizontal load supporting portion of the plate and the vertical mounting portion of the toe plate as the dies come together in the fifth progression. Also in the fifth step, three additional rib areas are formed in the toe plate between the horizontal load portion and the vertical mounting portion and these additional rib areas connect the previously formed six ribs from the first step into three continuous ribs which pass through the 90 degree bend between the horizontal and vertical portions of the toe plate. These continuous three ribs add substantial bending strength to the relatively thin gauge sheet stock from which the toe plate has been formed. Also in progression step five, the tab areas connecting each toe plate to the progressing coil sheet are severed prior to the 90 degree bend. In the fifth stage, an additional gusset rib is formed across the top of the vertical mounting portion between the two mounting ears to provide additional reinforcement in the mounting area of the toe plate. The completed toe plate is formed in a single piece having three reinforcing ribs which extend across the horizontal portion of the toe plate and extend up into the vertical mounting areas of the toe plate so as to provide a relatively high bending strength toe plate formed from a relatively thin gauge of sheet stock. The three reinforcing ribs which extend from the horizontal portion of the toe plate through the 90 degree bend to the vertical portion of the toe plate add substantial strength to the toe plate thus permitting the use of a much simplified form with a substantial weight reduction over previously cast or welded toe plate designs.

The principal objective of the present invention is to provide an inexpensive lightweight toe plate design formed from coiled sheet stock with automated tooling without any welding or assembly requirements.

BRIEF DESCRIPTION OF THE DRAWINGS

FIG. 1 is a plan view of the progression of tooling steps in the formation of the toe plate from a rolled sheet;

FIG. 5 is a partial sectional view, taken along lines 5—5 of FIG. 4;

FIG. 6 is a partial sectional view, taken along lines 6—6 of FIG. 4;

FIG. 7 is an isometric view of the fully formed toe plate design of the present invention.

DETAILED DESCRIPTION OF THE INVENTION

Figure 9:
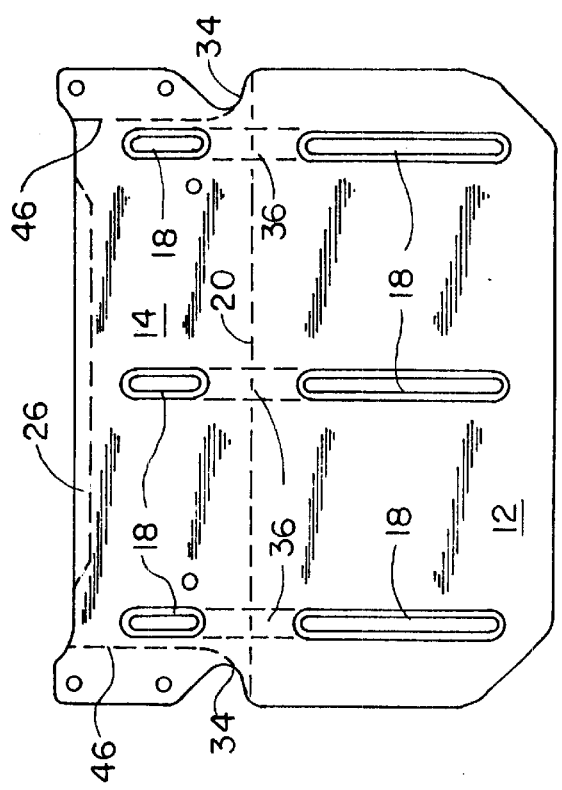
FIG. 9 is a plan view of a single toe plate severed from the sheet 28 before the bending steps.

Referring to FIG. 7 of the Drawings, the toe plate of the present invention is generally recognized by reference numeral 10. It comprises a horizontal load supporting portion 12, a vertical mounting portion of 14 including a planar portion with a pair of mounting ears 16 on each end of the planar portion. Extending longitudinally on both portions of the toe plate 10 are series of three reinforcing ribs 18 which extend through the 90 degree bend 20 between portions of 12 and 14. Extending across the top of vertical portion 14 is a gusset rib 26 which adds bending strength to portion 14 of the toe plate.

Figure 8:
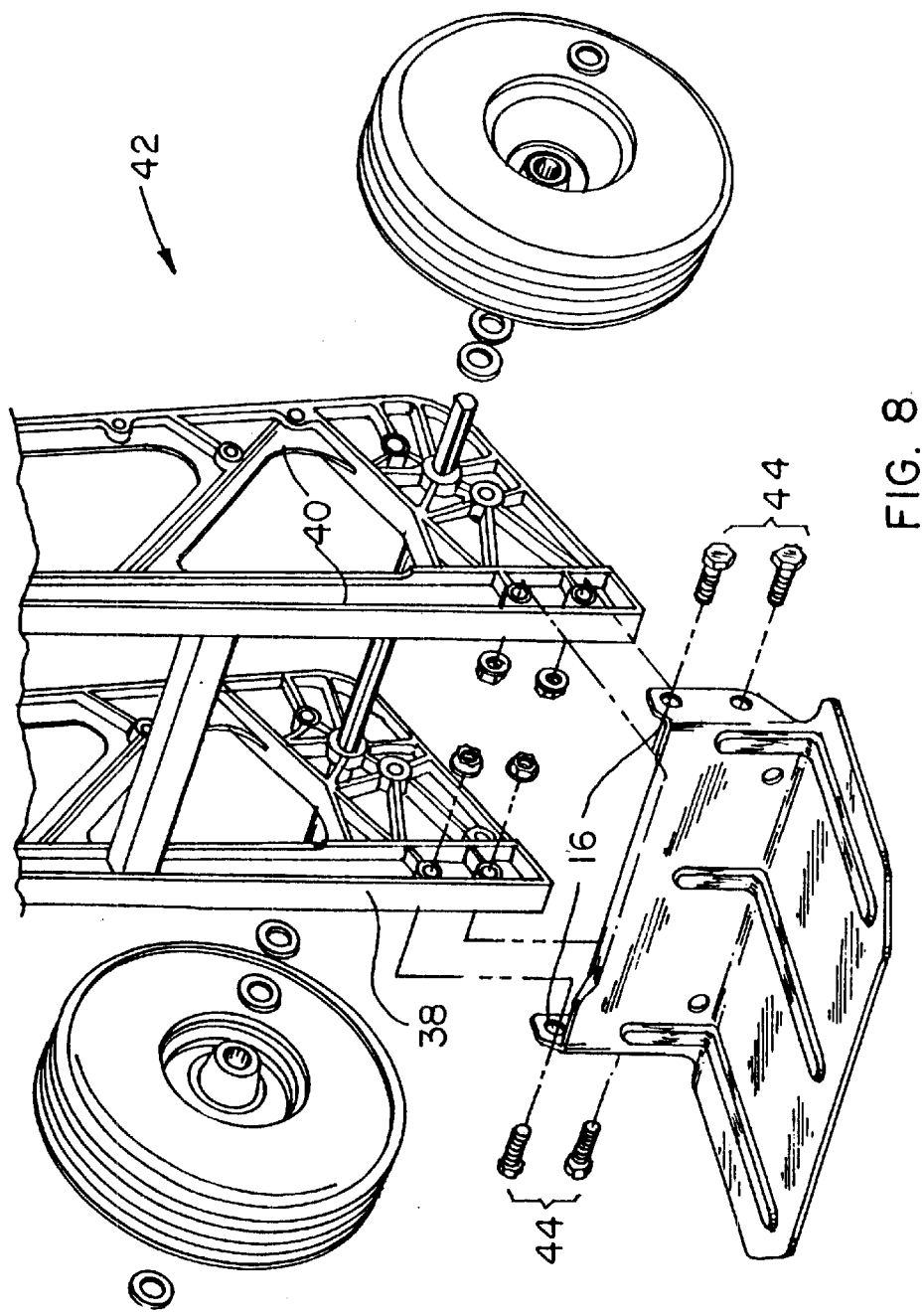
FIG. 8 is an exploded isometric view of the toe plate mounted on a hand truck.

FIG. 8 illustrates the manner in which toe plate 10 mounts to the side frames 38 and 40 of hand truck 42. A pair of bolts 44 attach right and left ears 16 to side frames 38 and 40 in such a manner to spread the load on each side frame over the full length of ear 16. The complete structure of hand truck 42 is described in detail in U.S. Patent No. 5,749,588.

In FIG. 1, the first progressive step in forming of the toe plate 10 takes place with the formation of three pairs of parallel ribs 18' and 18" which are formed in the uncoiled sheet 28, as it is fed into the tooling.

At the second tooling station, all of the mounting holes 22 are punched into the sheet as well as the stamping of partial slots 32 which shape the end surfaces of the toe plate. Two tabs 24 are left in place so as to retain each toe plate adjoined to the moving sheet 28 passing through the various forming stations prior to severing, as shown in FIG. 9.

In the third station, lateral side notches 34 are cut into the sheet defining the horizontal portion 12 from the vertical portion 14.

In the fourth station, ears 16 on both ends of vertical portion 14 are bent inward 90 degrees along dotted line 46. The metal adjacent notch 34 is stretched as the bend is made along line 46 thereby increasing the strength of the edges of a portion of the horizontal portion 12 and vertical portion 14. The pair of holes 22 mount to the side frames 38 and 40 of the hand truck which is shown in FIG. 8.

Figure 4:
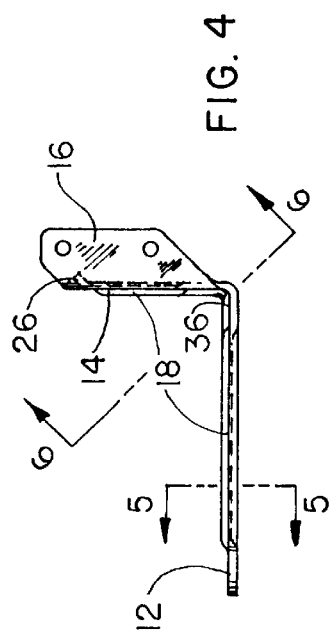
FIG. 4 is a side elevational view of the formed toe plate.
Figure 2:
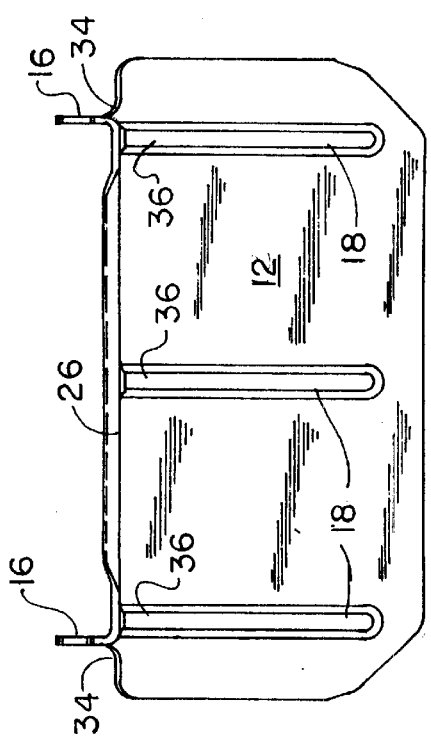
FIG. 2 is a top plan view of the completed toe plate.
Figure 3:
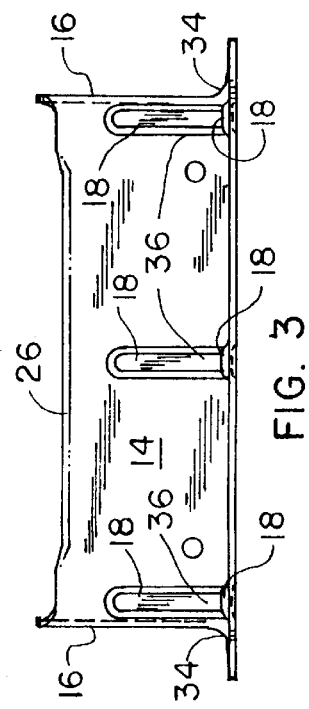
FIG. 3 is a front elevational view of the toe plate.

The fifth and last progressive station forms a 90 degree bend 20 as shown in detail in FIG. 4. The mated tooling as it comes together to form the 90 degree bend also includes an added rib area 36 as shown in dotted line in FIG. 9 and seen in detail in FIGS. 4 and 5. This added rib 36 at the 90 degree bend 20 provides additional bending strength between the horizontal portion 12 of the toe plate and the vertical portion 14. Due to the rib structure in the toe plate, the gauge of steel utilized can be 11 gauge or thinner. Also, in progression station 5, the tabs 24, as seen in FIG. 1, connecting each toe plate to the coil sheet are severed prior to the 90 degree bend. In the fifth station, an additional lateral gusset rib 26 is formed across the top of the portion 14 between the two mounting ears 16 to provide additional rigidity.

The metal adjacent the notch 34 is stretched during the formation of the 90 degree bend 20, thus increasing the strength of the edges of the horizontal portion 12 and vertical portion 14.

As will be readily apparent to those skilled in the art, the invention may be used in other one-piece form or for other purposes without departing from its light gauge and high strength characteristics. The present embodiment is therefore to be considered as illustrated and not restrictive, the scope of the invention being indicated by the claims rather than by the foregoing description, and all embodiment which come within the meaning and range of equivalents of the claims are intended to be embraced therein.

What is claimed is:

1. A hand truck toe plate formed from light-gauge steel for mounting on a pair of side frames comprising:
   a load supporting horizontal portion and a mounting vertical portion separated by a 90 degree bend, two notches in the vertical portion, one on each side, the mounting vertical portion includes a planar portion and two lateral ears, one on each side of the planar portion, each ear having an end defined substantially by one of said notches, said ears are bent 90 degrees to the planar portion along a bend line inboard of said notch such that the edge of the notch is stretched, and fasteners for mounting each ear to one of said side frames;
   the horizontal and vertical portions both having two or more longitudinal ribs therein which continue through both horizontal and vertical portions.

2. A hand truck toe plate, as set forth in claim 1, wherein the edges of the notches are also stretched as the 90 degree bend is made between the horizontal and vertical portions of the toe plate.

3. A hand truck toe plate, as set forth in claim 1, including the forming of a lateral rib across the top of the vertical portion of the toe plate.

4. A hand truck toe plate, as set forth in claim 1, wherein the lateral ears mount to the outside surface of each side frame through at least two bolts on each ear.

5. The method of forming a hand truck toe plate from a roll of light gauge steel sheet comprising the steps of:
   stamping at least two series of longitudinal ribs in the unrolled sheet, both series being longitudinally aligned with each other;
   forming mounting holes and partial slots in the sheet which define the ends of toe plate;
   forming a pair of notches in the sides of the sheet defining a pair of ears;
   bending the pair of ears normal to the sheet along a longitudinal line to form mounting surfaces for attachment to the side frames of a hand truck; and
   cutting each partially formed toe plate from the sheet and bending the severed sheet 90 degrees into a horizontal load supporting portion and a vertical mounting portion and at the same time stamping an additional rib connecting the series of previously formed ribs together into single continuous ribs.

6. The method of forming as set forth in claim 5 wherein the ears are bent along a longitudinal line positioned inboard of the pair of notches.

7. Method of forming a hand truck toe plate from a constant width roll of light gauge steel comprising the steps of:
   stamping at least two series of longitudinal ribs in the unrolled sheet, both series being aligned longitudinally;
   forming mounting holes and partial slots in the sheet which defines the ends of the toe plate;
   forming a pair of notches in the sides of the sheet defining a pair of ears;
   bending the pair of ears normal to the sheet along a longitudinal line;
   cutting each partially formed toe plate from the sheet and bending the severed sheet 90 degrees, just outboard of said notches, into a horizontal load supporting portion and a more narrow vertical mounting portion.

8. A hand truck toe plate formed from a light-gauge constant width steel roll for mounting on a pair of side frames comprising:
   a load supporting horizontal portion and a mounting vertical portion separated by a 90 degree bend, two notches one at each end of the bend, the vertical portions having two lateral ears bent back 90 degrees to the vertical portion with fastening means for mounting each ear to one of said side frames;
   the horizontal portion having the width of the steel roll, while the vertical portion has a reduced width equivalent to the roll width less the depth of the two ears, the horizontal and vertical portions having two or more longitudinal ribs therein which continue through both horizontal and vertical portions.

* * * * *